Nov. 15, 1927.
F. ROBINSON
SPECTACLE OR EYE GLASS CASE
Filed Dec. 12, 1923
1,649,255
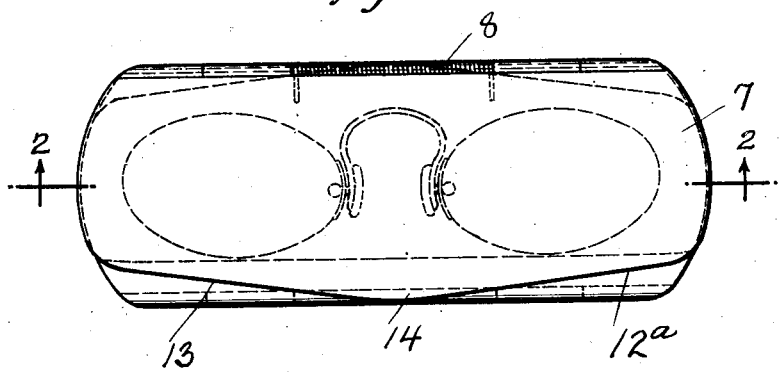
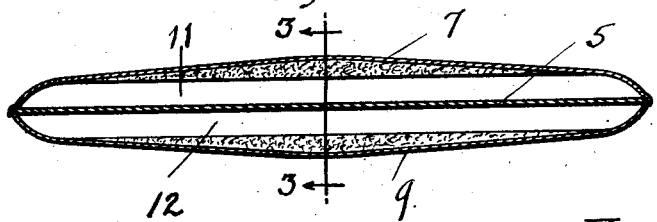
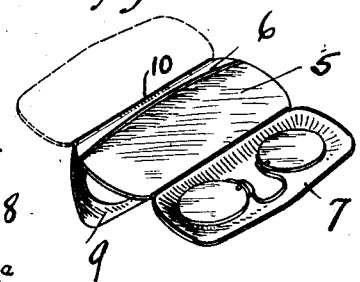
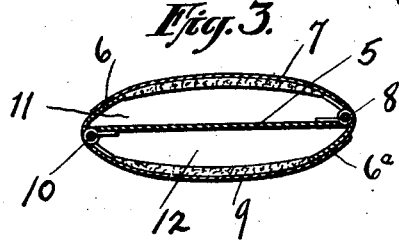
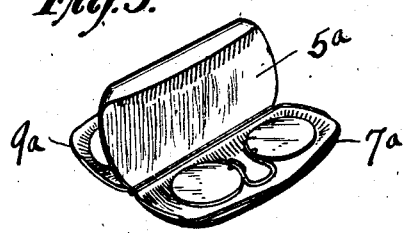
INVENTOR.
FREDERICK ROBINSON.
BY
ATTORNEY.

Patented Nov. 15, 1927.

1,649,255

UNITED STATES PATENT OFFICE.

FREDERICK ROBINSON, OF BROOKLYN, NEW YORK.

SPECTACLE OR EYEGLASS CASE.

Application filed December 12, 1923. Serial No. 680,266.

This invention relates to spectacle or eye glass cases and more particularly to a novel and improved dual compartment case wherein two pairs of glasses or spectacles may be confined and be readily accessible as desired.

It is well known that many persons are compelled to use eye glasses and spectacles for reading and work purposes which must be changed from time to time necessitating the use of a separate and individual case for each pair of glasses or spectacles. In order to overcome and avoid the necessity of carrying two cases, I have provided a novel and improved casing where two pairs of glasses or spectacles may be confined in a minimum of space, and readily accessible when desired.

A further object of my invention is to provide an eye glass or spectacle case wherein a central partition is provided with two hingedly connected leaves or closures which constitute a compartment on each side of the partition wherein the eye glass or spectacles may be confined.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a plan of the eye glass or spectacle case.

Figure 2 is a sectional view taken on the line 2—2 of Figure 1.

Figure 3 is a further sectional view taken on the line 3—3 of Figure 2.

Figure 4 is a view showing the case when opened.

Figure 5 is a modified form of an open casing embodying my invention.

Referring now to the drawings wherein like reference characters designate corresponding parts throughout the several views, particularly referring to Figures 1 and 2, 5 designates the central partition or wall having an inwardly extending flange 6 on one edge of one of its sides and a similar flange 6$^a$ on the opposite edge of its reverse side. A leaf or closure 7 is connected by a spring hinge 8 to the longitudinal edge of the partition wall 5, said closure being of a width to overlie the edge of the flange 6 as shown by Figure 3. A similar closure 9 is provided for the opposite side of the partition wall 5 and is connected by a spring hinge 10 below and on the opposite side of the plate 5 referred to. The last mentioned closure or leaf 9 also overlies the flange 6$^a$ and thus it will be seen that a compartment 11 and a compartment 12 is formed having the common partition wall 5 whereby two pairs of eye glasses or spectacles may be confined in a relatively small casing. As is customary in eye glass cases of this character, the outer edge of the leaf or closures 7, 9, are partly cut away as indicated at 12$^A$ and 13, so that the central portion or apex 14 of each closure is bowed midway between the ends of the casing. It will thus be seen that by simply turning or reversing the casing, either leaf, 7 or 9 may be opened and the spectacles or eye glasses removed when desired.

In the form of the invention shown by Figure 5, a similar partition wall 5$^a$ is shown but in this instance, it will be observed that the leaves or closures 7$^a$, 9$^a$, are connected by a sutable spring hinge at the same longitudinal edge of the partition 5$^a$. This produces an eye glass case which opens somewhat in the form of the leaves of a book and also permits of the convenient removal of the spectacles or eye glasses from either side when desired.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:—

A spectacle case or frame comprising a central rigid partition member constituting the divisional wall of the case, the opposite longitudinal edges of whch are turned in opposite directions to provide inturned, retaining flanges, covers made of rigid material connected to the opposite longitudinal edges and on opposite sides of said partition member at a point adjacent said flanges and arranged, when in closed position to overlie the flanges opposite to those adjacent which they are attached, and said case being substantially elliptical in shape in central cross section.

In testimony whereof I affix my signature.

FREDERICK ROBINSON [L. S.]